(12) United States Patent
Zorzi et al.

(10) Patent No.: US 11,769,278 B2
(45) Date of Patent: Sep. 26, 2023

(54) POLYGONAL BUILDING EXTRACTION FROM SATELLITE IMAGES

(71) Applicant: Blackshark.ai GmbH, Graz (AT)

(72) Inventors: Stefano Zorzi, Graz (AT); Shabab Bazrafkan, Graz (AT); Friedrich Fraundorfer, Graz (AT); Stefan Habenschuss, Graz (AT)

(73) Assignee: Blackshark.ai GmbH, Graz (AT)

( * ) Notice: Subject to any disclaimer, the term of this patent is extended or adjusted under 35 U.S.C. 154(b) by 38 days.

(21) Appl. No.: 17/982,120

(22) Filed: Nov. 7, 2022

(65) Prior Publication Data

US 2023/0146018 A1 May 11, 2023

Related U.S. Application Data

(60) Provisional application No. 63/289,010, filed on Dec. 13, 2021, provisional application No. 63/277,800, filed on Nov. 10, 2021.

(51) Int. Cl.
*G06T 11/20* (2006.01)
*G06T 7/73* (2017.01)
*G06T 7/13* (2017.01)

(52) U.S. Cl.
CPC ............. *G06T 11/203* (2013.01); *G06T 7/13* (2017.01); *G06T 7/73* (2017.01); *G06T 2200/04* (2013.01); *G06T 2207/10032* (2013.01); *G06T 2207/20084* (2013.01); *G06T 2207/20164* (2013.01); *G06T 2207/30184* (2013.01)

(58) Field of Classification Search
CPC ... G06T 11/203; G06T 7/13; G06T 7/73; G06T 2200/04; G06T 2207/10032; G06T 2207/20084; G06T 2207/20164; G06T 2207/30184

See application file for complete search history.

(56) References Cited

U.S. PATENT DOCUMENTS

2021/0342586 A1* 11/2021 Fleisig et al. ........ G06V 20/182

OTHER PUBLICATIONS

Attention Is All You Need, Ashish Vaswani, Dec. 6, 2017.
MonteFloor: Extending MCTS for Reconstructing Accurate Large-Scale Floor Plans, Sinisa Stekovic. ICCV2021, Jun. 19-25, 2021.
(Continued)

*Primary Examiner* — Jin Cheng Wang
(74) *Attorney, Agent, or Firm* — Beyer Law Group LLP

(57) ABSTRACT

Vectorization of an image begins by receiving a two-dimensional rasterized image and returning a descriptor for each pixel in the image. Corner detection returns coordinates for all corners in the image. The descriptors are filtered using the corner positions to produce corner descriptors for the corner positions. A score matrix is extracted using the corner descriptors in order to produce a permutation matrix that indicates the connections between all of the corner positions. The corner coordinates and the permutation matrix are used to perform vector extraction to produce a machine-readable vector file that represents the two-dimensional image. Optionally, the corner descriptors may be refined before score extraction and the corner coordinates may be refined before vector extraction. A three-dimensional or N-dimensional image may also be input. A convolutional neural network performs descriptor extraction and corner detection; a graph neural network produces the refinements; and an optimal connection network performs score extraction.

20 Claims, 10 Drawing Sheets

(56) References Cited

OTHER PUBLICATIONS

S. Zorzi, "PolyWorld: Polygonal Building Extraction with Graph Neural Networks in Satellite Images", IEEE/CVF Conference on Computer Vision and Pattern Recognition Workshops (CVPRW), Jun. 19-24, 2022, pp. 1848-1857 (Year: 2022).*

Sinkhorn Distances: Lightspeed Computation of Optimal Transportation Distances, Marco Cuturi, Jun. 4, 2013.

SuperGlue: Learning Feature Matching with Graph Neural Networks, Paul-Edouard Sarlin, Mar. 28, 2020.

X. Zhu, et al., "Deformable DETR: Deformable Transformers for End-to-End Object Detection", ICLR 2021, Mar. 18, 2021, pp. 1-16 (Year: 2021).*

Y. Hu, et al., "PolyBuilding: Polygon Transformer for Building Extraction", ISPRS Journal of Photogrammetry and Remote Sensing 199 (2023), pp. 15-27 (Year: 2023).*

Y. Wang, et al., "Machine-learned 3D Building Vectorization from Satellite Imagery", IEEE/CVF Conference on Computer Vision and Pattern Recognition Workshops (CVPRW), Jun. 19-25, 2021, pp. 1072-1081. https://doi.org/10.1109/CVPRW53098.2021.00118 (Year: 2021).*

* cited by examiner $$\begin{array}{c c} & \begin{array}{cccc} A & B & C & D \end{array} \\ \begin{array}{c} A \\ B \\ C \\ D \end{array} & \left[ \begin{array}{cccc} 0 & 1 & 0 & 1 \\ 1 & 0 & 1 & 1 \\ 0 & 1 & 0 & 1 \\ 1 & 1 & 1 & 0 \end{array} \right] \end{array}$$

200 ⤴

ADJACENCY MATRIX

210 ⤴

GRAPH

| 59.9 | 20.2 | -42.9 | 49.7 | 39.9 | -9.8 | -19.8 | 45.3 |
| -4.0 | -41.9 | -36.5 | 19.6 | -2.8 | -18.6 | 24.7 | -5.8 |
| -91.2 | 54.9 | -37.3 | -9.4 | 62.3 | -6.0 | -6.3 | 0.4 |
| 3.9 | -35.3 | 14.6 | 5.7 | 10.2 | -20.4 | 8.4 | 40.5 |
| 54.9 | -25.2 | -10.0 | 32.1 | 73.2 | 13.5 | -14.6 | -1.0 |
| -34.5 | 61.8 | -1.2 | -37.2 | 12.6 | 15.5 | 5.7 | -8.1 |
| 21/9 | -37.3 | 54.5 | 1.2 | -9/2 | -30.8 | 2.9 | -20/7 |
| 2.4 | 50.3 | -8.5 | 12.3 | -11.1 | -1.0 | 31.9 | -3.8 |

SCORE MATRIX

FIG. 9

| 0 | 0 | 0 | 0 | 1 | 0 | 0 | 0 |
| 0 | 1 | 0 | 0 | 0 | 0 | 0 | 0 |
| 0 | 0 | 0 | 1 | 0 | 0 | 0 | 0 |
| 0 | 0 | 0 | 0 | 0 | 1 | 0 | 0 |
| 0 | 0 | 0 | 0 | 0 | 0 | 0 | 1 |
| 1 | 0 | 0 | 0 | 0 | 0 | 0 | 0 |
| 0 | 0 | 1 | 0 | 0 | 0 | 0 | 0 |
| 0 | 0 | 0 | 0 | 0 | 0 | 1 | 0 |

PERMUTATION MATRIX

FIG. 10

POLYGONAL BUILDING EXTRACTION FROM SATELLITE IMAGES

CROSS-REFERENCE TO RELATED APPLICATIONS

This application claims priority of U.S. provisional Pat. Application No. 63/277,800, filed Nov. 10, 2021 (FISHP004P), and No. 63/289,010, filed Dec. 13, 2021 (FISHP004P2), which are both hereby incorporated by reference.

FIELD OF THE INVENTION

The present invention relates generally to image processing. More specifically, the present invention relates to vectorization of rasterized images.

BACKGROUND OF THE INVENTION

The extraction of vector representations of building polygons from aerial and satellite imagery has been growing in importance in many remote sensing applications, such as cartography, city modeling and reconstruction, as well as map generation. Most building extraction and polygonization methods rely on the vectorization of probability maps produced by a segmentation network. These approaches are not end-to-end learned, which means that imperfections and artifacts produced by the segmentation model are carried through the entire pipeline with the consequent generation of irregular polygons.

In the image processing, computer vision and machine learning sciences, the images are defined as a set of values in an N-dimensional Euclidean space known as a Tensor and in the two-dimensional use cases they also are referred to as a matrix. Two dimensional images comprise pixels placed in a row and column order wherein each pixel has a value that determines the intensity of that pixel. In the cases where an image is made of some polygonal and multi-polygonal objects, the image may be also represented by a set of vector shapes. These shapes are a set of point locations and the relation between them. This relation determines which point is connected to which other point in the polygon definition.

In many use cases such as building footprint detection for satellite or aerial imagery, road detection and object segmentation, the machine learning models are designed to return a raster version of the results. For example in the semantic segmentation use cases, in the model output, each pixel is assigned to a class of objects. As a more specific example, in the building footprint detection, each pixel of the image will be assigned to one of the classes in the [Building, Background] set. In many use cases, this output is required to be represented in the vector format which provides the opportunity to assign semantics to each vector object and applying vector operations to those detections. The act of turning pixel-based imagery into its vector counterpart is known as vectorization or a polygonization pipeline. This is a very challenging problem since vectorization being a synthesis problem does not have a single correct solution.

Prior art approaches have not been optimal. By way of example, consider the categories of building segmentation and polygon prediction. Nowadays, deep learning-based methods are state-of-the-art, mainly addressing the problem by refining raster footprints via heuristic polygonization approaches computed by powerful semantic or instance segmentation networks. The majority of these segmentation models is trained with cross entropy, soft intersection over union, or Focal based losses achieving great scores in terms of intersection over union, recall, and precision, but mostly generating irregular building outlines that are neither visually pleasing, nor employable in most cartographic applications. A typical problem of semantic and instance segmentation networks is, in fact, the inability of outlining straight building walls and sharp corners in presence of ground truth noise, e.g. misalignment between segmentation mask and intensity image. Some publications, therefore, suggest to post-process the segmented building footprints in order to align the segmentation outlines to the actual building contours described in the intensity image.

Polygon prediction can be classified into two categories. The first category includes methods that perform the vectorization of grid-like information, e.g. the probability map produced by a segmentation network. The polygonization is performed by ordering the detected corners following the regularized boundaries. All these methods are developed with the idea of decomposing the building extraction and polygonization problem into smaller tasks that can be tackled individually. As a result, most of these approaches are computationally heavy, they lack of parallelization and their hyper parameters must be carefully tuned in order to achieve the desired results. Most importantly, since they are composed of a sequence of blocks, these methods can accumulate errors through their pipeline, which can harm the quality of the final polygonization.

The second category is represented by methods that directly learn a vector representation. All these methods directly process polygon parameters but they are typically more difficult to train and they need multiple iterations during inference. Moreover they have troubles dealing with complex building shapes, e.g. structures having curved walls or holes in their shape.

SUMMARY OF THE INVENTION

To achieve the foregoing, and in accordance with the purpose of the present invention, a technique and apparatus is disclosed that inputs a two-dimensional rasterized image or an n-dimensional image produces a vectorized version that represents objects in the image.

The present invention fits well into the second category of direct polygon prediction mentioned above, although the employed architecture and general idea fundamentally differs from all existing work.

Many geographic and cartographic applications typically require precise vector polygons of extracted objects instead of rasterized output. The present invention directly extracts building vertices from an image and connects them correctly to create precise polygons. The model predicts the connection strength between each pair of vertices using a graph neural network and estimates the assignments by solving a differentiable optimal transport problem. Moreover, the vertex positions are optimized by minimizing a combined segmentation and polygonal angle difference loss. The invention significantly outperforms the state-of-the-art in building polygonization and achieves not only notable quantitative results, but also produces visually pleasing building polygons.

The invention presents a new way of tackling the building polygonization problem. Rather than learning a segmentation network which is then followed by a polygonization method, we propose a novel neural network architecture that detects building corners from a satellite image and uses a learned matching procedure to connect them in order to form polygons. Thereby, our method allows the generation of valid polygons in an end-to-end fashion.

The invention extracts positions and visual descriptors of building corners using a Convolutional Neural Network (CNN) and generates polygons by evaluating whether the connections between vertices are valid. This procedure finds the best connection assignment between the detected vertex descriptors, which means that every corner is matched with the subsequent vertex of the polygon. The connections between polygon vertices can be represented as the solution of a linear sum assignment problem. A Graph Neural Network (GNN) may be used that propagates global information through all the vertex embeddings, increasing the descriptors distinctiveness. Moreover, it refines the position of the detected corners in order to minimize the combined segmentation and polygonal angle difference loss. The invention demonstrates superior performance compared to the state-of-the-art building extraction and polygonization methods, not only achieving higher segmentation and detection results, but also producing more regular and clean building polygons. And even though we describe the invention using a neural network approach for detecting corners, the proposed method may also be implemented using any other suitable method to detect corners in an image.

Finally, the invention is not only applicable to two-dimensional images, but also to three-dimensional images such as medical images and also to N-dimensional information.

BRIEF DESCRIPTION OF THE DRAWINGS

The invention, together with further advantages thereof, may best be understood by reference to the following description taken in conjunction with the accompanying drawings in which:

FIG. 9 illustrates one particular embodiment of a score matrix.

FIG. 10 illustrates one particular embodiment of a permutation matrix.

DETAILED DESCRIPTION OF THE INVENTION

As mentioned above, vectorization is a challenging problem since vectorization being a synthesis problem does not have a single correct solution, i.e., different vectorizations are possible for the same pixel-based image.

Figure 1A:
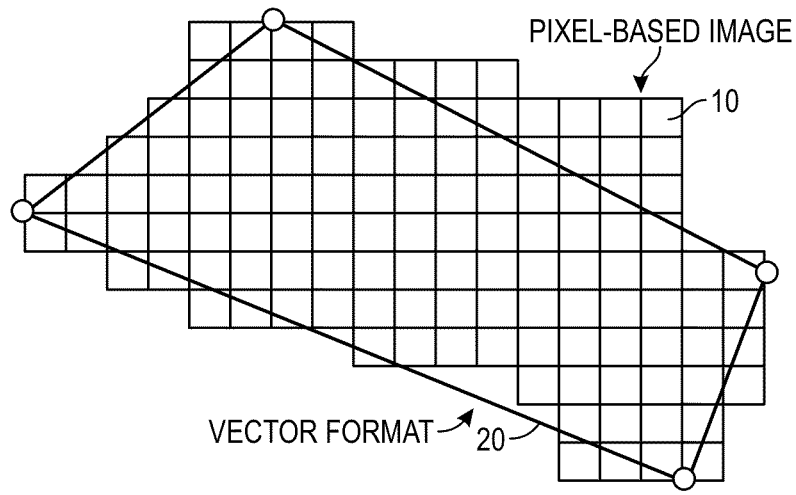
FIGS. 1A and 1B illustrate that two different vectorizations are shown for the same pixel-based image.
Figure 1B:
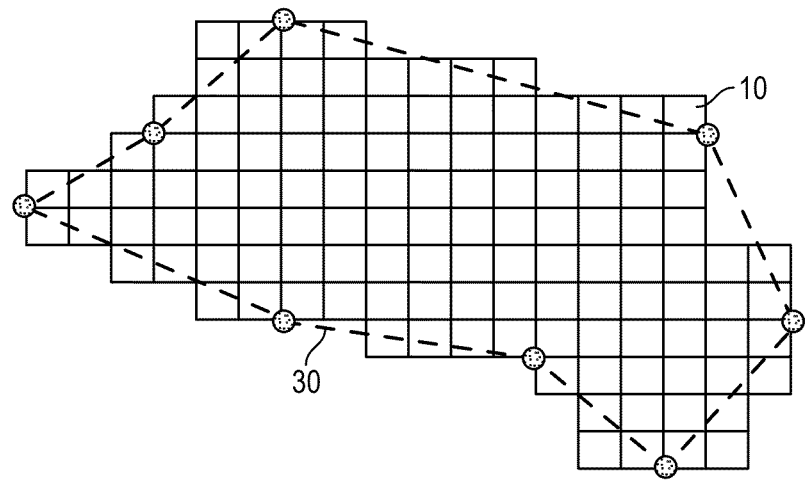

FIGS. 1A and 1B illustrate that two different vectorizations are shown for the same pixel-based image. Thus, for image 10 both vectorizations 20 and 30 are possible solutions. The correctness of the solution is often decided by the use case, for example, in the building footprint vectorization pipeline the straight edges and right corners are desirable, while in object segmentation and vectorization, the curved edges need to be preserved in the final outcome. Recognizing that identification of corners (vertices) and the relationship between vertices (i.e., which is connected to which) is an important and fundamental aspect of this synthesis problem, we propose the following embodiments in which we present a vectorization pipeline which may be used as a post-processing step or as an end-to-end solution for any use case.

Components of Vectorization Pipeline

Figure 2:
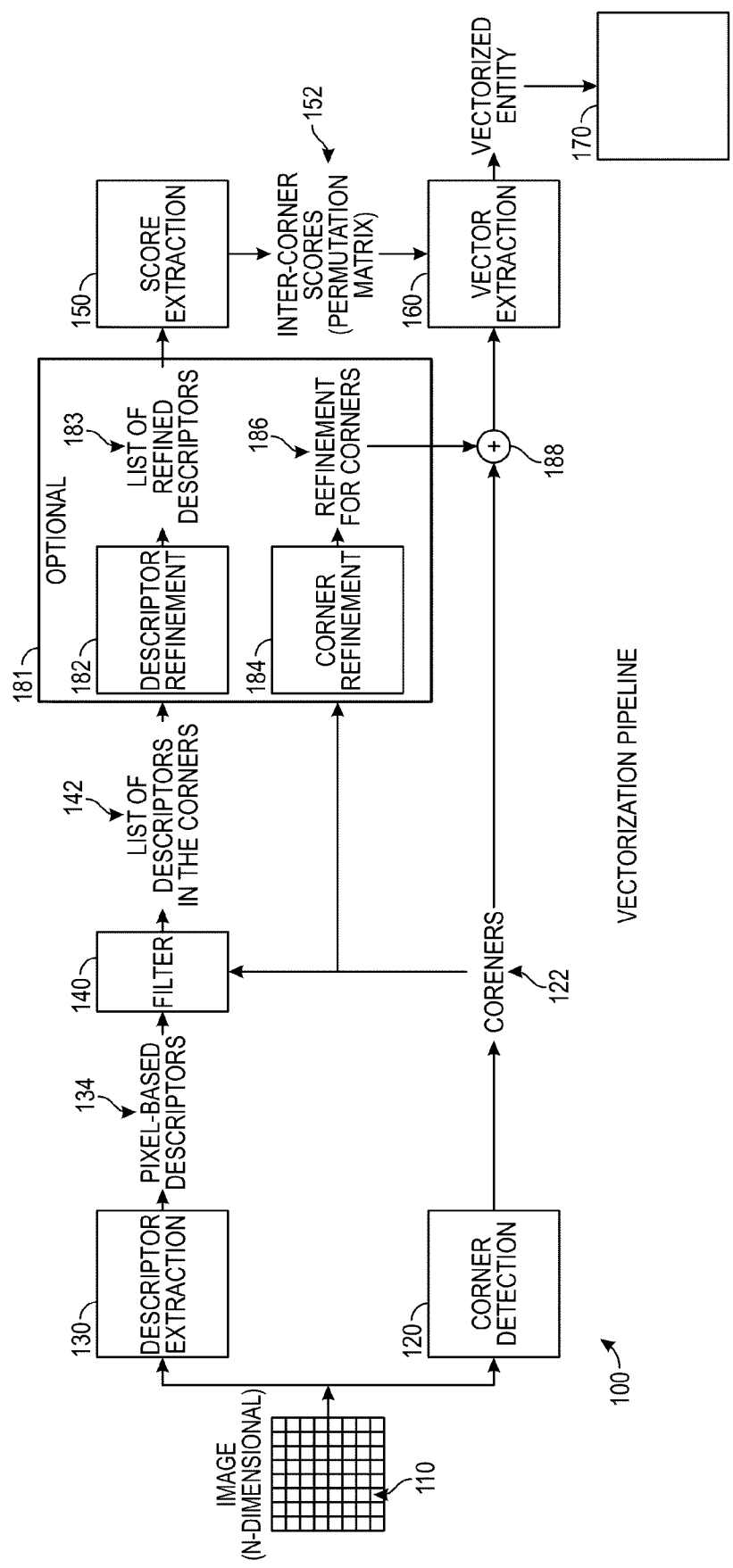
FIG. 2 is a block diagram of a vectorization pipeline.

FIG. 2 is a block diagram of a vectorization pipeline 100. This pipeline accepts an N-dimensional input image (where $N \geq 2$) and returns the vectorized entity for any prespecified application. Although the detailed description below presents specific modules, neural networks, and algorithms for implementing these components, other possible modules, etc. may be used and are mentioned below. If $N \geq 2$, then because neural networks are used, the input may be any N-dimensional image and the output may be in any dimension.

Image 110 is typically a two-dimensional pixel-based image such as a satellite image or photographic aerial imagery, but may also be a three-dimensional image (e.g., a 3-D image or video file, a 2-D image or video file plus time, medical scans such as brain images, an MRI image, CAT scan, 3-D tiling, etc.), or an N-dimensional image such as a 3-D image or video plus time. In a 3-D image a corner is also referred to as a corner. In N dimensions, a corner may be a corner of a 3-D image or video at a timestamp. In a 3-D image or video the equivalent of a pixel is referred to as a "voxel."

Descriptor extraction 130 is a processing unit that looks at the image 110 and returns a descriptor for each pixel location in the image. The descriptors optionally have abstract meanings, In other words the descriptor for each pixel location does not need to be a human-readable or -understandable entity. For example, each pixel may be described by an M-dimensional list of numbers ($M \geq 1$) that have been defined by the network. There may be 60 of such descriptors or more per location. The descriptor extraction unit may be a model-based processor, for example a local binary pattern extractor or may be learning based, for example a deep neural network which is a part of end-to-end training of the whole pipeline.

Corner detection 120 is a processing unit that returns the corners 122 in its input image. The output of the corner detection represents what is defined as corner in the problem definition. This unit may be a model-based corner detection, for example Harris or minimum eigenvalue corner-detection methods. Or, it also may be any learning-based corner detection unit such deep neural networks trained for a given specific problem optionally followed by a non maximum suppression unit. Units 120 and 130 may be implemented separately or within the same unit or neural network as described below.

Filter 140 is an operation that extracts the descriptors 142 for the corner points. For example, for an image containing 20 corners, the output of the filter operation is 20 lists of descriptors which are the descriptors extracted from the input image in the corner locations.

Optional components are found in block 181. Descriptor refinement 182 is a component in which the extracted descriptors 142 are passed through a descriptor refinement to extract a new set of descriptors 183. This new set of descriptors 183 has a better representation of the vectorization-related information which is important for the following processing units. Thus, for each location, there will be a new set of different descriptors, but not a different number of descriptors for each location. This refinement may be a neural network which is trained end-to-end in the vectorization pipeline 100.

Corner refinement 184 is a component in which extracted corner positions 122 are passed through a corner refinement to calculate an offset 186 for each corner that might have been introduced by imperfections in the corner detection component 120. The corner refinement component 184 may be a part of a learning-based algorithm that is trained end-to-end constrained to minimize or maximize a predefined energy function.

Figures 3, 4:
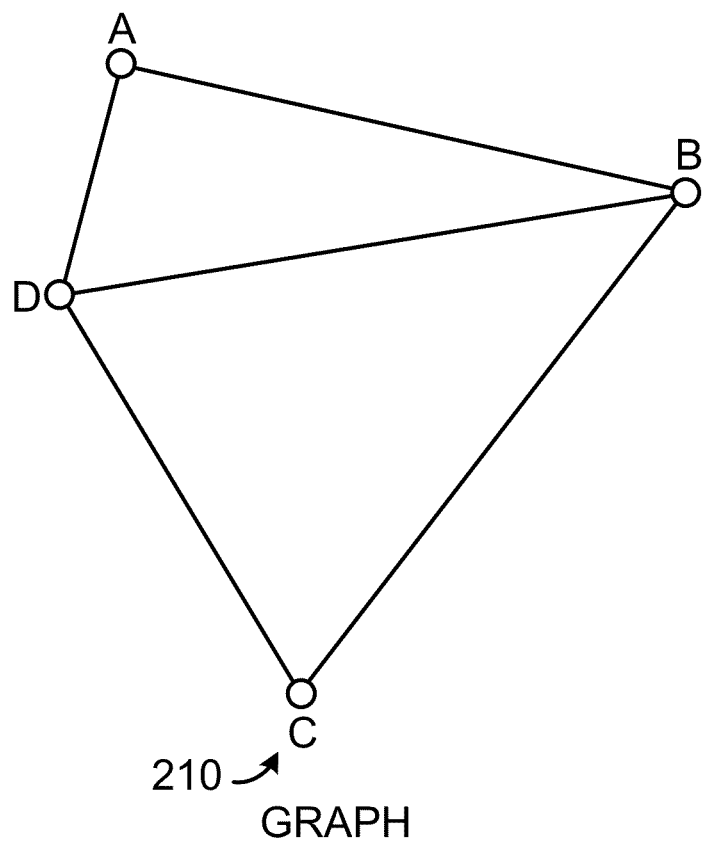
FIG. 3 shows an example of an adjacency matrix.
FIG. 4 shows a corresponding graph.

Score extraction component 150 extracts a matrix of scores that determine the connection between the corners in the image. The score matrix can show cyclic or acyclic graphs by assigning one or more scores to each corner node pair. FIG. 3 shows an example of an adjacency matrix 200 describing the graph of FIG. 4. FIG. 4 shows a corresponding graph 210. In this matrix 200 the score "1" is assigned to a node pair if and only if they are connected in the graph 210 and score "0" is assign to non-adjacent or non-connected pairs. The matrix (or matrices) of scores is then converted into a final permutation matrix 152 (described in detail below) which defines which vertices are connected to one another. The above is a simplistic example. In the implementation described and shown below, a score matrix comprises real values and the final permutation matrix will "1s" and "0s."

Vector extraction 160 is the processing component that converts the corner locations 122 and the permutation matrix 152 into a machine-readable vector file or vectorized entity. The user is able to choose the proper format of the vector format. There are several standards for vector files, for example CMG, SVG, XMF, EPS, JSON, GeoJson and Shapefiles to name a few, or any similar comparable industry file standard may be used. The vector encoding process itself is a conversion step to extract the vector file from the corner positions and the permutation matrix. Typically, vector extraction comprises computer code that generates the vector format, i.e., a vector exporter.

The vector file may be used to produce a result 170, such as overlaying the vectors (vertices 171 and line vectors 172) over the original input image. Further is also possible to produce result 170 from the permutation matrix and the corner locations, or also possible to produce result 170 from the score matrix and the corner locations.

The vectorization of detected entities is one of the main steps in providing the final results for the end user. Most of the prior art image-processing and image-based machine learning algorithms return pixel-based results at their output. The vectorization process as a post-processing step or as an end-to-end solution is a highly desired feature in any segmentation, detection and analysis tool. It gives the possibility to export the outputs to any machine-readable vector format and run vector analysis and manipulation operations including but not limited to intersection, difference, buffer, union and hundreds of other operations that are highly optimized for vector data.

Detailed Embodiment of Vectorization Pipeline

Figure 5:
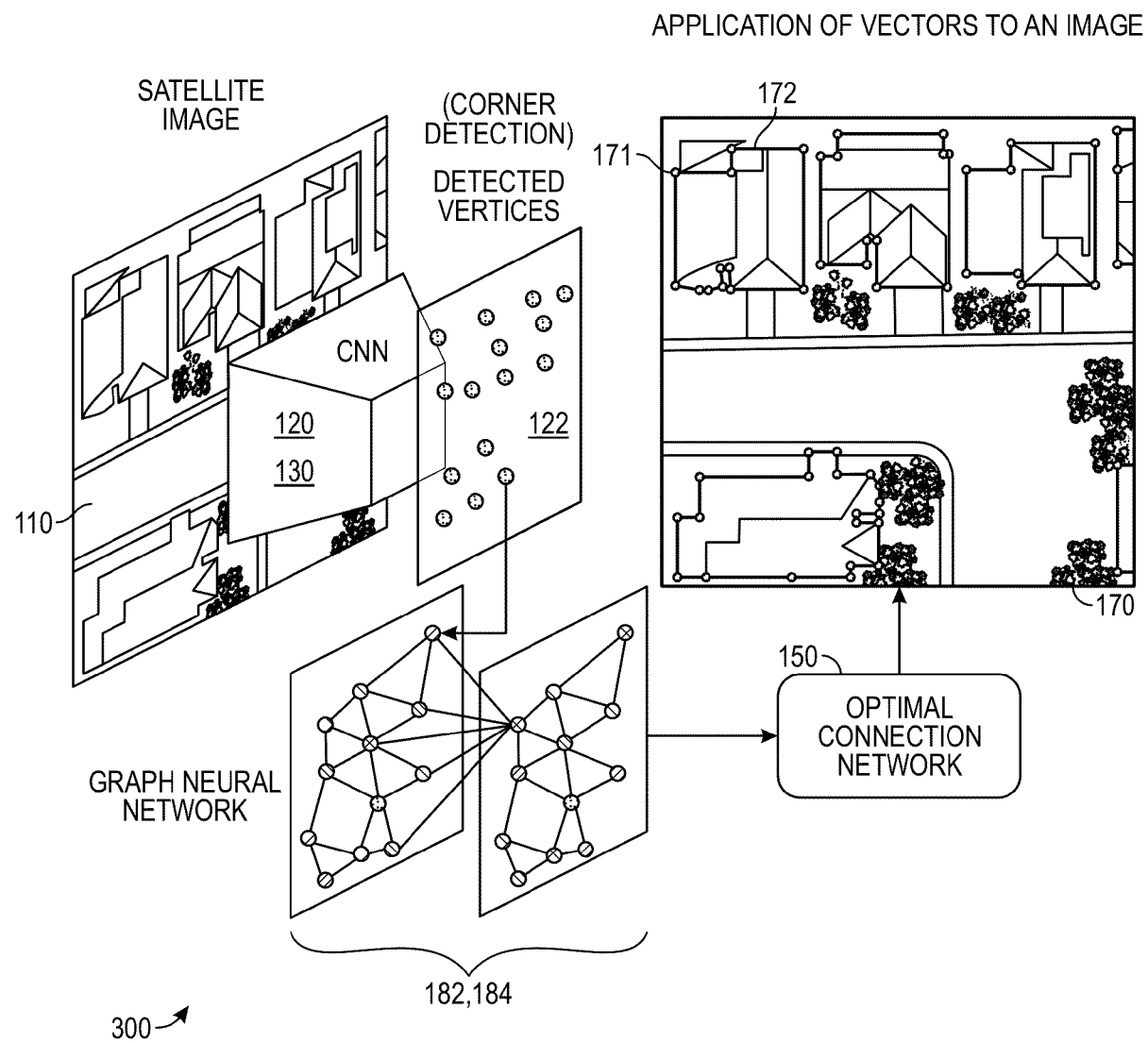
FIG. 5 is a high-level block diagram of one detailed embodiment showing polygonal object extraction.

FIG. 5 is a high-level block diagram of one detailed embodiment showing polygonal object extraction. Shown is a Convolutional Neural Network (CNN) implementing components 120 and 130 that detects vertices 122 and produces descriptors 134 from an input image 110. A Graph Neural Network (GNN) implements components 182, 184 and finally an Optimal Connection Network implements component 150 and produces the permutation matrix, which may then be used to perform vector extraction 160. Shown is a displayed result 170 in which corners 171 and vectors 172 are superimposed over image 110 thus showing the vectorization of the rasterized image. The method uses the CNN backbone to detect the vertices from the image, and aggregates the information of the visual descriptors exploiting the GNN. The connections between vertices are generated solving a differentiable optimal transport problem.

In general, this embodiment is composed of three blocks: a Vertex Detection Network that extracts a set of possible building corner candidates and implements components 120, 130 and 140; an Attentional Graph Neural Network (GNN) that aggregates information through the vertices, refines their position and refines descriptors, implementing components 182, 184; and an Optimal Connection Network that generates the connections between vertices, implementing component 150. Given the input image, the model provides the position of the detected building corners and a valid permutation matrix. As a permutation matrix is important in understanding this embodiment, it will be described first.

Figure 6A:
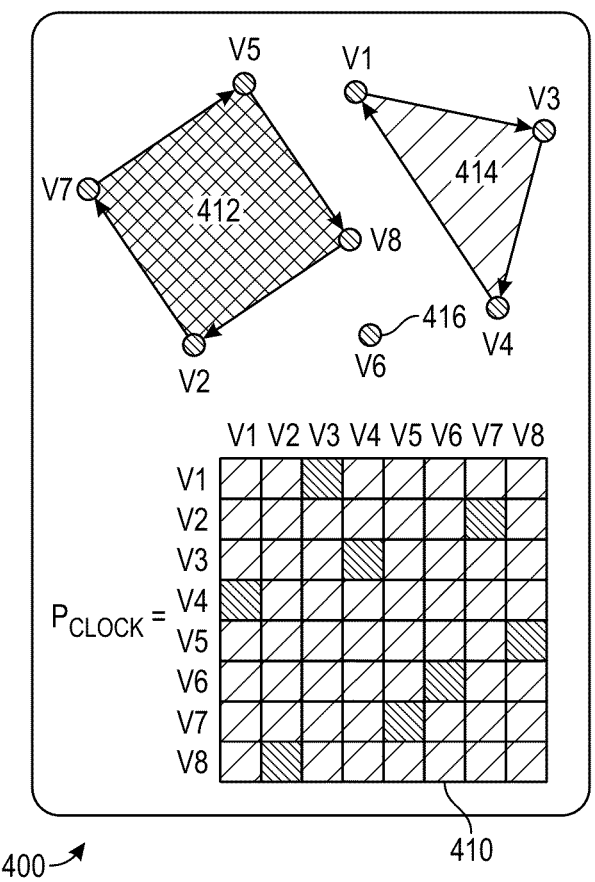
FIGS. 6A and 6B illustrate two permutation matrices, each representing vertices and polygons.
Figure 6B:
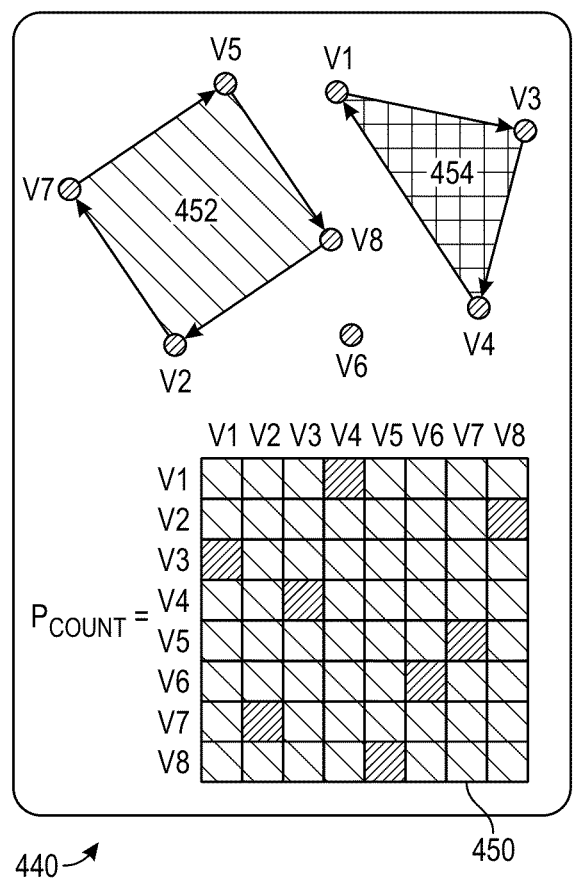

FIGS. 6A and 6B illustrate two permutation matrices, each representing vertices and polygons. These matrices are created by optimal connection network 150 and are used to perform vector extraction 160. As shown, matrix 410 represents clockwise polygons 412 and 414, and matrix 450 represents counter-clockwise polygons 452 and 454. Preferably, two such matrices are used in order to improve results, although only one such matrix is necessary. Training especially can be improved through the use of two such matrices. Vertex V6 416 is not part of either polygon, as indicated in the matrices. One goal of the invention is to represent building (for example) polygons in a scene as a set of vertices connected according to a permutation matrix, as illustrated at 410 and 450, although the vertices need not represent corners in the case of higher order dimensions.

Each corner of polygon 412 or 414 is associated with a specific row of the permutation matrix 410 that indicates the next clockwise vertex. Similarly, each corner of polygon 452 or 454 is associated with a specific row of the permutation matrix 450 that indicates the next counter-clockwise vertex. Each permutation matrix fulfills certain polygonal constraints: 1) every vertex corresponds to at most one clockwise connection and one counterclockwise connection; 2) the permutation matrix of the clockwise oriented polygons is the transposed of the counterclockwise permutation matrix; 3) a vertex having its entry in the diagonal of a permutation matrix can be discarded since, in reality, there are no building polygons having a single corner, e.g. vertex v6.

As shown, the connections between polygon vertices V1-V8 are described with a permutation matrix 410 or 450. The i-th row of the permutation matrix Pclock 410 or Pcount 450 indicates the index of the next clockwise or counterclockwise vertex connected to vi. Note that the permutation matrix 410 of the clockwise oriented polygons 412, 414 is the transposed of the permutation matrix 450 of the counterclockwise oriented polygons 452, 454.

Figure 7:
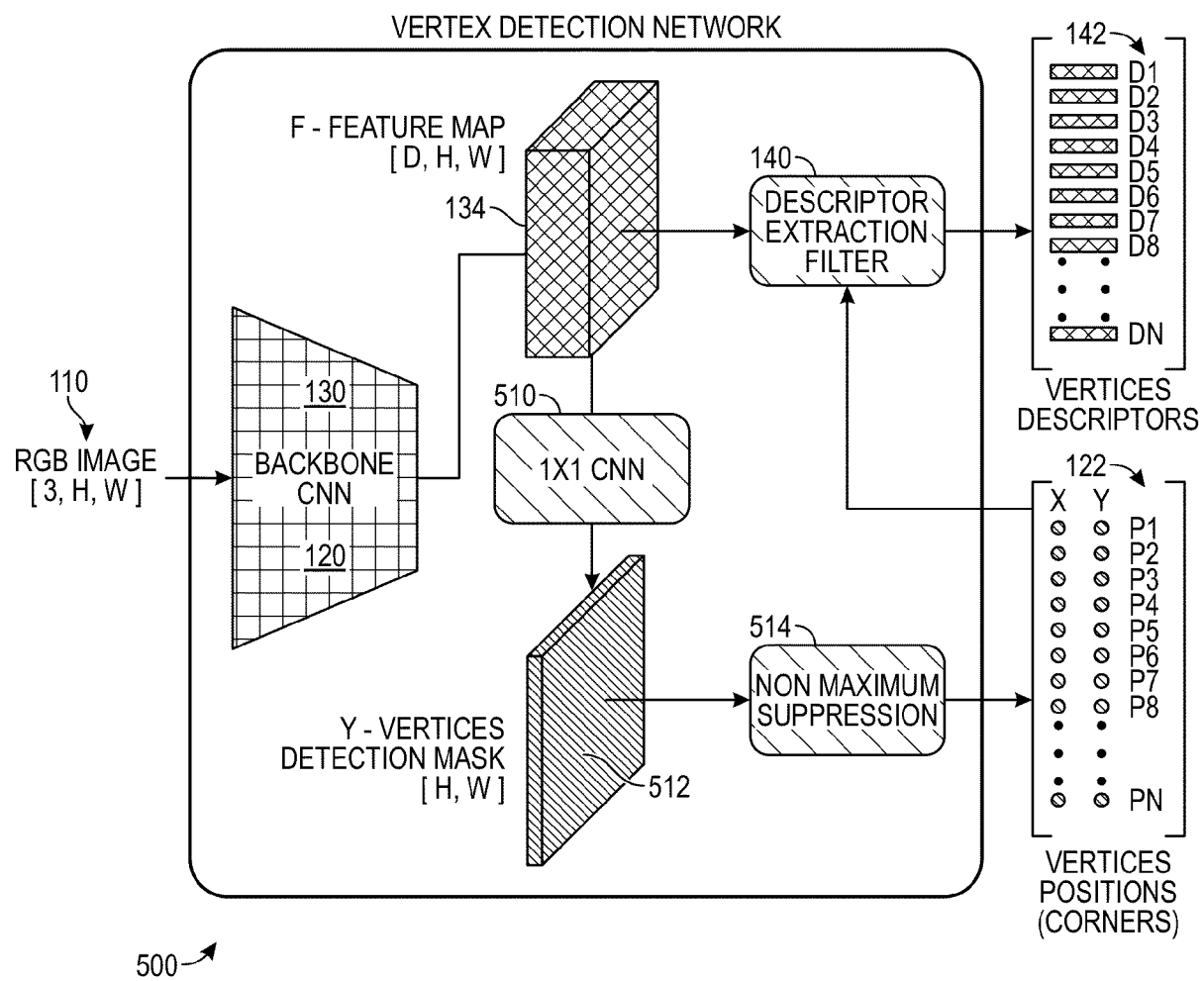
FIG. 7 is a block diagram of the Vertex Detection Network.

FIG. 7 is a block diagram 500 of the Vertex Detection Network. Shown is an input image 110, components 120, 130, 140, and output results from these components 134, 142, 512 and 122. In general, Vertex Detection Network

500 includes a backbone CNN that receives the intensity image 110 and returns a features map 134 and a vertex detection mask 512. A Non Maximum Suppression (NMS) algorithm 514 removes undesired vertices and returns N locations 122 that correspond to the highest peaks in the detection mask. The visual descriptors 142 are then extracted 140 from the feature map 134 at every location 122 provided by the NMS.

To further explain, the network 500 receives an image I 110, I being a member of R [3, H, W], such as an RGB image as input; it forward propagates I through a fully convolutional CNN backbone, and returns a D-dimensional feature map 134 F, F being a member of R [D, H, W]. The vertex detection mask Y 512, Y being a member of R [H, W] is obtained by propagating the features F through a 1_1 convolutional layer 510. The detection mask Y is then filtered using a Non Maximum Suppression algorithm 514 with kernel size of 3, in order to retain the most relevant peaks. The positions p of the N highest peaks 122 are then used to extract N visual descriptors d 142, d being a member of R [D] from the feature map F. Vertex positions 122 consist of x and y image coordinates pi := (x; y)i. During training, the backbone not only learns to produce a feature map F 134 useful to segment building corners but it also learns to embed an abstract representation of the latter. During training, this information is constrained to represent the building vertex by matching with the other detected corners.

Figure 8:
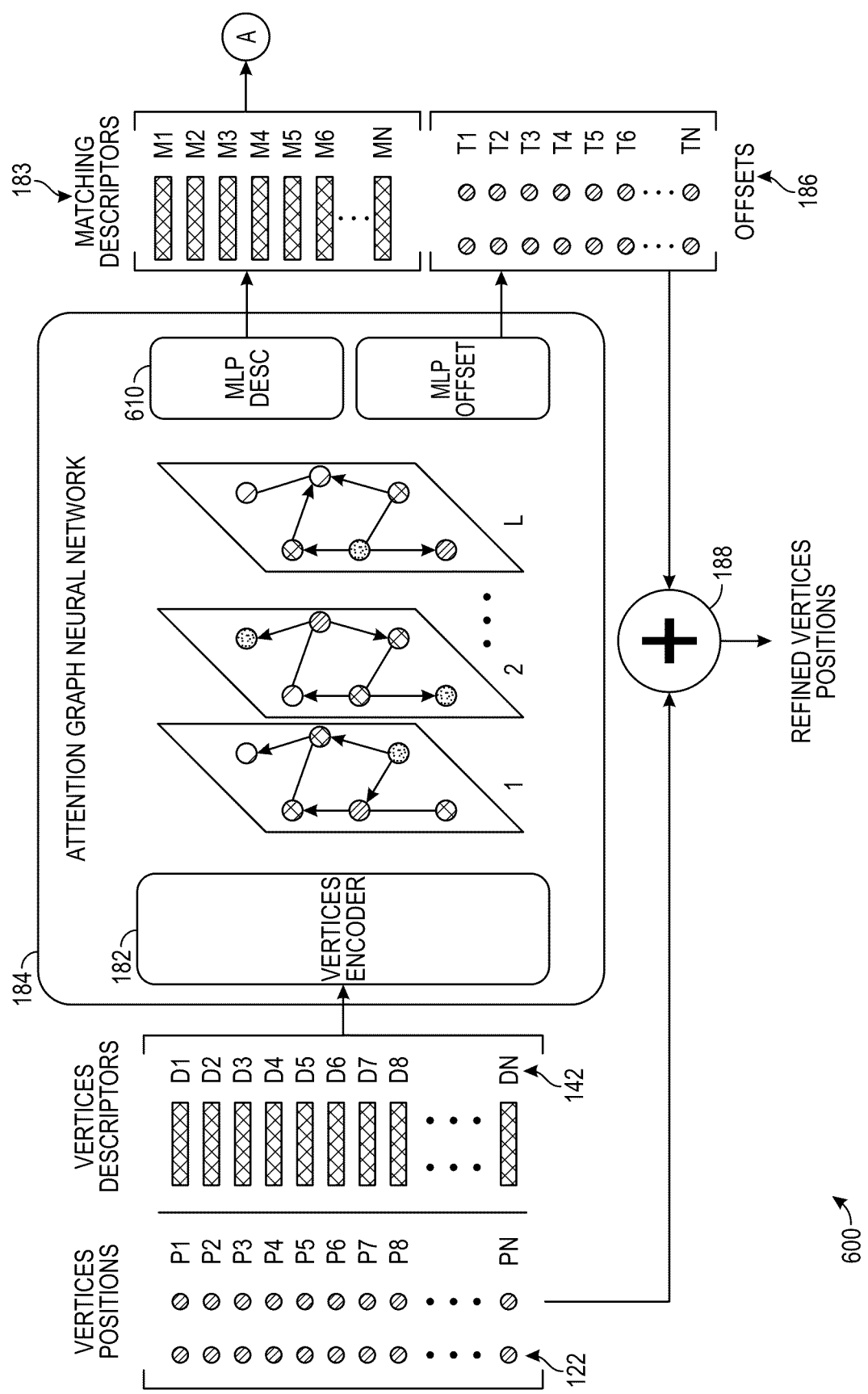
FIG. 8 illustrates both the optional Attention Graph Neural Network (GNN) as well as the optimal connection network.
Figure 8:
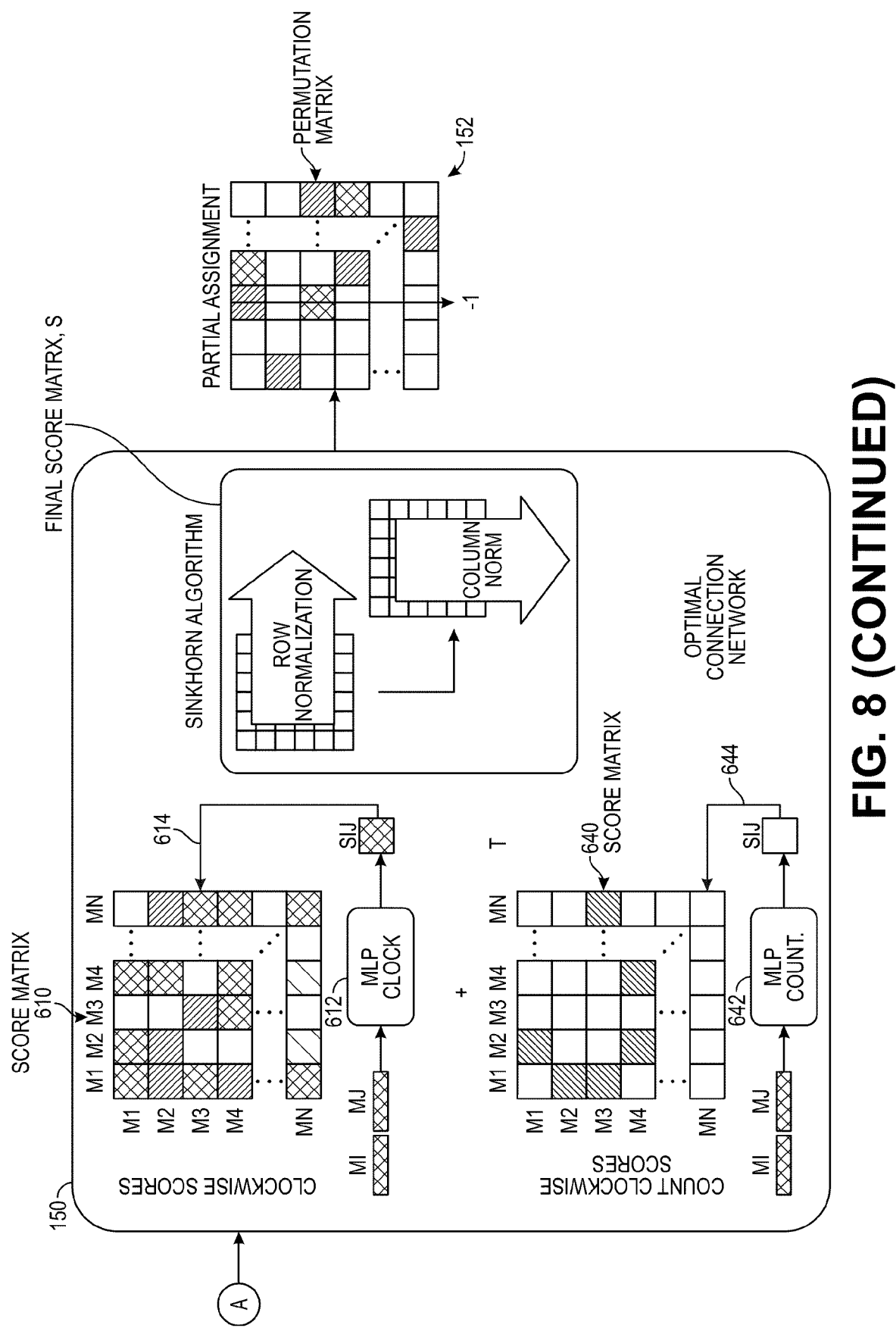

FIG. 8 illustrates both the optional Attention Graph Neural Network (GNN) 610 as well as the optimal connection network 150. In general, GNN 610 uses a vertex encoder to map vertex positions p and visual descriptors d into a single vector, and uses L self-attention layers to increase their distinctiveness. The GNN returns a set of offsets t and the matching descriptors m.

The offsets are used to refine the vertex positions, while m are propagated through the optimal connection network 150 that creates an N X N score matrix and generates the permutation matrix using the Sinkhorn algorithm. MLP 612 is a neural network that will look at all different combination of descriptors, and, for each combination, will return a number or score 614, which is then added to score matrix 610. MLP 642 and score 644 operate in the same way to produce score matrix 640. Thus, score extraction is implemented with MLPs 612, 642 and the Sinkhorn algorithm.

Use of the GNN will be described first. As shown, vertices 122 and descriptors 142 are input into GNN 610, implementing components 182 and 184, and outputting matching descriptors 183 and offsets 186. Necessarily, descriptors m1 (for example) will correspond to position p1, etc. Offsets 186 are combined 188 with positions 122 to create refined vertices positions for input into vector extraction 160.

Besides the position and the visual appearance of a building corner, considering other contextual information is essential to describe it in a more rich and distinctive way. Capturing relationships between its position and appearance with other vertices in the image can be helpful to link it with corners having the same roof style, having a compatible shape and pose for the matching, or simply with adjacent corners. Motivated by this consideration, we use an Attentional Graph Neural Network (GNN) that computes a set of matching descriptors mi, mi being a member of $R^D$, by learning short and long term vertex relationships analyzing the vertex positions p and the visual descriptors v extracted by the vertex detection network. Moreover, this block also estimates a positional offset ti, ti being a member of $R^2$, in order to refine the vertex positions optimizing the corner angle and the footprint segmentation. As we will show in the following chapters, aggregating features from all the detected vertices and refining the vertex positions leads not only to improved segmentation scores, but also to more realistic building polygons.

The vertices encoder operates as follows. Before forward propagating through the Graph Neural Network, positions p and visual descriptors d are merged by a Multilayer Perceptron (MLP).

$$d'_i = \text{MLP}_{enc}([d_i \| p_i]) \qquad (1)$$

$\text{MLP}_{enc}$ receives the concatenation $[\cdot \| \cdot]$ of $p_i$ and $d_i$ and returns a new descriptor $d' \in R^D$ that encodes positional and visual information together.

The self attention network operates as follows. The aggregation is performed by a self-attention mechanism that propagates the information across vertices, increasing their contextual information. Given the intermediate descriptors $x \in R^D$ $R^{D \times N}$, the model employs a linear projection to produce a query Q(x), a key K(x), and a value V (x). The weights between the nodes are computed taking the softmax over the dot product $Q(x)K(x)^T$. The result is then multiplied with the values V (x) in order to propagate the information across all the vertices. The attention mechanism can be written as:

$$A = \text{softmax}\left(\frac{Q(x) \cdot K(x)^T}{\sqrt{d_k}}\right) V(x) \qquad (2)$$

where the normalization term $d_k$ is the dimension of the queries and keys. This operation is repeated for a fixed numbers of layers L. The message $A(l) \in R^{D \times N}$ is the attention result at layer l and it is used to update the vertex descriptors at every step. We indicate the $i$-th column of $A^{(l)}$, that represents the attention message relative to the i-th vertex of the graph. In every layer the vertex descriptors are updated as follows:

$$x_i^{(l)} x_i^{(l+1)} = \quad + \text{MLP}^{(l)}\left(\left[x_i^{(l)} \| a_i^{(l)}\right]\right) \qquad (3)$$

The embeddings received by the first attention layer are the descriptors produced by the vertex encoder $d^0 = x^{(l=0)}$. Finally, the embedding of the i-th vertex produced by the last attention layer $x_i^{(L)}$ is then decomposed in two components: a matching descriptor $\in R^D$ and a positional offset $t_i \in R^2$.

$$m_i = MLP^{match}\left(x_i^{(L)}\right) \qquad (4)$$

$$t_i = MLP^{offset}\left(x_i^{(L)}\right) \qquad (5)$$

The matching descriptors are used further to generate a valid combination of connections between the vertices, while the offsets are combined to the vertices positions as follows:

$$p\hat{}_i = p_i + \gamma \cdot t_i \qquad (6)$$

where γ is a factor that regulates the correction radius since the offsets are generated through a HardTanh activation function and the values range between -1 and 1.

The optimal connection network 150 may be implemented as follows. The last block is the optimal connection layer that connects the vertices generating a permutation matrix P ∈ $R^{N \times N}$. The assignment can be obtained calculating a score matrix S ∈ $R^{N \times N}$ for all possible vertex pairs and maximizing the overall score $P_{i,j} P_{i,j} S_{i,j}$.

Given two matching descriptors $m_i$ and $m_j$ encoding the information of two distinct vertices, we exploit $MLP_{clock}$ to detect whether the clockwise connection $m_i \rightarrow m_j$ is possible. The network receives the concatenation of the two descriptors and returns a high score value if the connection between them is strong; e.g. if $m_i$ represents the top-left corner of an orange roof, it is likely that $m_j$ is the next clockwise vertex if it represents a top-right corner of an orange roof.

$$s_{i \rightarrow j}^{clock} = \mathrm{MLP}_{clock}\left(\left[m_i \| m_j\right]\right) \quad (7)$$

Vice-versa we estimate how strong is the counterclockwise connection $m_i \rightarrow m_j$ exploiting a second network $MLP_{count}$.

$$s_{i \rightarrow j}^{count} = \mathrm{MLP}_{count}\left(\left[m_i \| m_j\right]\right) \quad (8)$$

By enforcing the constraint 2 we can establish a consistency check between the clockwise and the counterclockwise path of vertices. The final score matrix S is calculated as the combination of the clockwise score matrix $S_{clock}$ and the transposed version of the counterclockwise score matrix Scount:

$$S = Sclock + Scount^{\wedge}T$$

The double path consistency ensures to have stronger matches, better connections and, ultimately, higher polygon quality.

As a final step, we use the Sinkhorn algorithm to find the optimal partial assignment (i.e., permutation matrix P 152) given the score matrix S. (We call it "partial" because not all of the vertices are connected. Some vertices were discarded as they were assigned to the diagonal of the permutation matrix.) The Sinkhorn is a GPU efficient and differentiable version of the Hungarian algorithm, used to solve linear sum assignment problems, and it consists of normalizing rows and columns of exp(S) for a certain amount of iterations. The final permutation matrix may be either the clockwise or counter-clockwise matrix. Preferably, vector extraction is performed using the final permutation matrix and not using the score matrix.

FIG. 9 illustrates one particular embodiment of a score matrix. In this example, the score matrix is composed of real numbers.

FIG. 10 illustrates one particular embodiment of a permutation matrix. In this example, the permutation Matrix is a matrix composed of zeros and ones, in such a way that the sum of every column equals "1," and the sum of every row equals "1."

If the GNN is not used, then vertices descriptors 142 may be input directly into network 150 instead of matching descriptors 183 and vector extraction 160 will use the original corner coordinates 122 rather than adding in the corner refinements 186.

Losses

Regarding detection, we train the corner detection as a segmentation task using weighted binary cross-entropy loss:

$$\mathcal{L}_{det} = -\omega \cdot \sum_{i=1}^{H}\sum_{j=1}^{W} \overline{Y}_{i,j} \cdot \log\left(Y_{i,j}\right) \\ - \sum_{i=1}^{H}\sum_{j=1}^{W}\left(1-\overline{Y}_{i,j}\right) \cdot \log\left(1-Y_{i,j}\right) \quad (10)$$

The ground truth $\overline{Y}$ is a sparse array of zeros. Pixels that indicate the presence of a building corner have value of one. Since the segmentation is heavily unbalanced for the foreground pixels, we use a weight ω = 100 to counterbalance positive samples.

Regarding matching, the attention graph neural network and the optimal connection network are fully differentiable which allows us to back propagate from the generated partial assignment to the backbone that generates the visual descriptors. This path is trained in a supervised manner from the ground truth permutation matrix $\overline{P}$ using cross entropy loss:

$$\mathcal{L}_{match} = -\sum_{i=1}^{N}\sum_{j=1}^{N} \overline{P}_{i,j} \cdot \log\left(P_{i,j}\right) \quad (11)$$

Due to the iterative normalization through rows and columns made by the Sinkhorn algorithm, minimizing the negative log-likelihood of the positive matches of P leads to simultaneously maximizing the precision and the recall of the matching.

Regarding positional refinement, due to low image resolution, ground truth misalignments, or wrong building labeling, the position of the vertices provided by the vertex detection network is not optimal in practice. The subsequent matching procedure, therefore, could produce polygons having corner angles different from the ground truth, altering the visual appeal of the extracted polygons. In order to repress this phenomenon, we minimize the difference between the corner angles of the predicted polygons and the ground truth polygons.

We indicate with C the function that converts a permutation matrix and vertex positions to a list of polygons P. The polygons predicted and the ground truth polygons are then P = C (p,P) and $\overline{P} = C(\overline{p}, \overline{P})$, respectively. Indicating with $P_k$ the k-th polygon instance extracted from the image and composed of a set of clockwise ordered vertex positions, we formulate the angle loss as:

$$\mathcal{L}_{angle} = \sum_{k=1}^{K}\sum_{(u,v,w)} 1 - \exp\left(-\sigma \cdot \left|\Delta_{k,(u,v,w)}\right|\right) \quad (12)$$
$$\Delta_{k,(u,v,w)} = \angle(\hat{p}_u, \hat{p}_v, \hat{p}_w)_k - \angle(\overline{p}_u, \overline{p}_v, \overline{p}_w)_k$$

where (u v w) denotes the indices of any three consecutive vertices in polygon $P_k$ and $\overline{P}_k$. The strength of the loss term is regulated by the factor σ, while $\angle(p^{\wedge}_u, p^{\wedge}_v, p^{\wedge}_w)_k$ and $\angle(\overline{p}_u, \overline{p}_v, \overline{p}_w)_k$ indicate the angle at the v-th vertex of the polygon $P_k$ and $\overline{P}_k$, respectively.

Even if the network is encouraged to fix corner angles, $L_{angle}$ potentially induces unexpected modifications of the polygon shapes since it leaves some degrees of freedom to the network on how to warp the vertices. In our experiments the network stretched the polygons in undesired ways while respecting the angle criterion, potentially producing misaligned footprints. We fix this issue by minimizing a segmentation loss between the ground truth and predicted polygons. This refinement loss not only inhibits unwanted effects of $L_{angle}$, but it also increases segmentation scores as documented in the next chapters.

We generate the footprint mask of the predicted polygons exploiting a Differentiable Polygon Rendering method. It is the soft version of the winding number algorithm that checks whether a pixel location x is inside the polygon with the equation:

$$W(x, P_k) = \sum_{(u \to v)} \frac{\lambda \cdot \det(\hat{p}_u x, \hat{p}_v x)_k}{1 + |\lambda \cdot \det(\hat{p}_u x, \hat{p}_v x)_k|} \angle(\hat{p}_u, x, \hat{p}_v)_k \quad (13)$$

where (u v) are the indices of any two consecutive vertices of $P_k$, det(·) is the determinant of vectors $p\hat{}_u q$ and $p\hat{}_v q$, and the value $\lambda$ fixes the smoothness of the raster contours.

Calculating the winding number for every pixel location in the image, we generate the raster mask $M_k \in R^{H \times W}$ of the polygon $P_k$. The segmentation loss $L_{Seg}$ is finally calculated as the soft intersection over union between the ground truth segmentation mask $\bar{M}$ and the combination of extracted polygon masks:

$$\mathcal{L}_{seg} = \text{softIoU}\left(\sum_{k=1}^{K} M_k, \bar{M}\right) \quad (14)$$

Since the NMS block is not differentiable, the only way for the network to minimize $L_{Seg}$ and $L_{angle}$ is to generate a proper set of offsets t for the Equation 6.

Implementation Details

Regarding training and inference, the NMS algorithm extracts a list of N = 256 vertex positions p with the highest detection confidence. During training, these positions are not directly used to extract the descriptors d from the features F, but they are first sorted to match the nearest neighboring ground truth point. After sorting, $p_i$ is the closest vertex to the ground truth point P- i. This procedure ensures to have index consistency between the positions p and the ground truth permutation matrix $\bar{P}$. In reality, the number of extracted points N is always greater than the number of building corners in the image, therefore the vertices that do not minimize the distance with any of the ground truth points have their entry assigned to the diagonal of $\bar{P}$. We train from scratch linearly combining detection, matching and refinement losses: Ldet +Lmatch +Langle +Lseg. Rather than learning the matching branch at the early training stage, we prefer to first pretrain the vertex detection network only using $L_{det}$. When it extracts sufficiently accurate building corners, we keep training the full architecture with the complete loss. During inference, vertices that have their entry in the diagonal of the permutation matrix are discarded (constraint 3).

Regarding architecture, as backbone we use a Residual U-Net model. The descriptor dimension and the intermediate representations of the attention graph neural network have the same size D = 64. We use L = 4 self attention layers having 4 parallel heads each. During training the permutation matrix P is calculated performing T= 100 Sinkhorn iterations, while during inference we calculate the exact linear sum assignment result using the Hungarian algorithm on the CPU. With this configuration a forward pass takes on average 24 ms per image (320 × 320 pixels) on a NVIDIA GTX 3090 and an AMD Ryzen7 3700X.

Computer System Embodiment

Figure 11A:
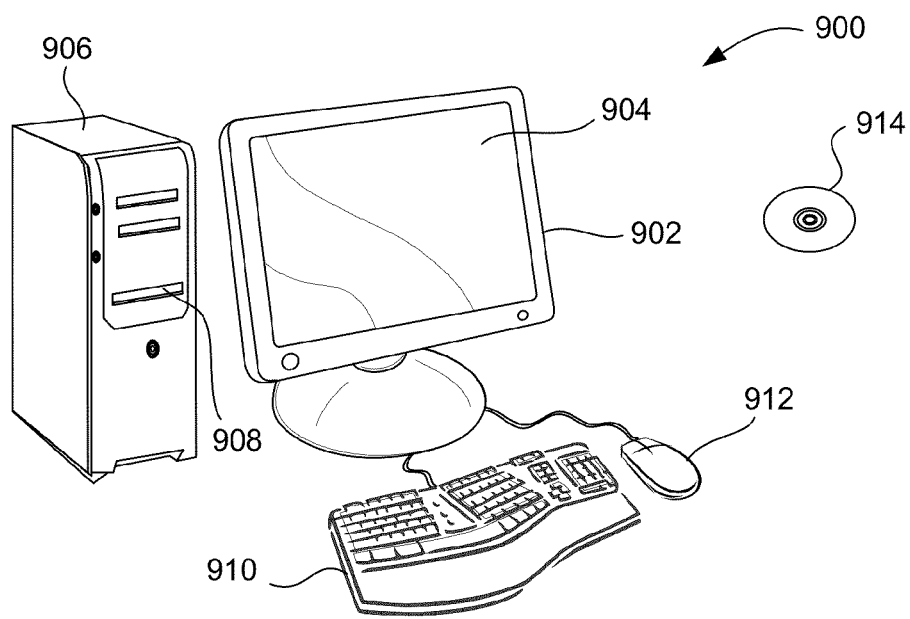
FIGS. 11A and 11B illustrate a computer system suitable for implementing embodiments of the present invention.
Figure 11B:
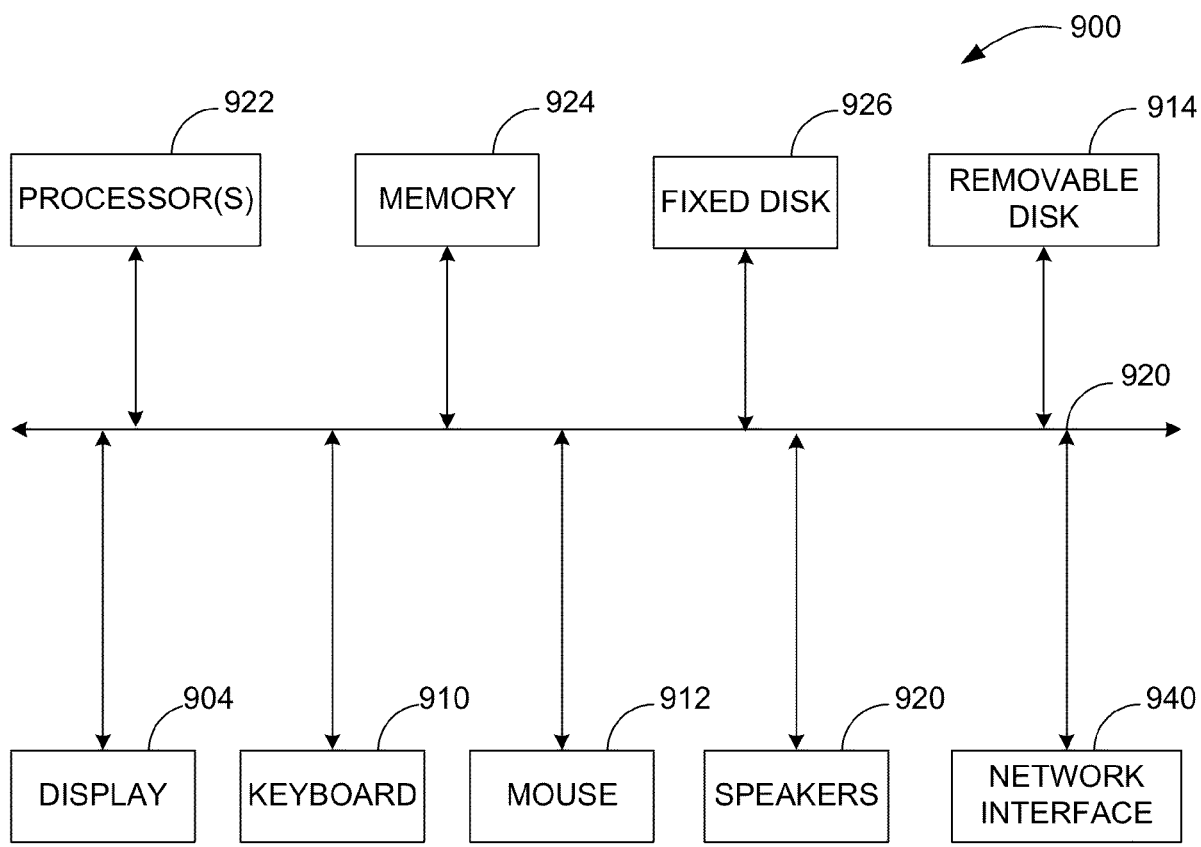

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of vectorization of an image, said method comprising:
    receiving a two-dimensional image;
    processing said image and returning a descriptor for each pixel in said image;
    processing said image and returning a plurality of corner positions of said image;
    filtering said descriptors using said corner positions and returning corner descriptors for said corner positions;
    extracting a score matrix from said corner descriptors that indicates connections between said corner positions, each pair of corner positions being assigned a score;
    converting said score matrix into a permutation matrix; and
    converting said corner positions and said permutation matrix into a machine-readable vector file that represents said two-dimensional image.

2. A method as recited in claim 1 further comprising:
    refining said corner descriptors using a neural network to produce refined corner descriptors; and
    extracting said score matrix from said refined corner descriptors.

3. A method as recited in claim 1 further comprising:
    refining said corner positions to calculate an offset for said each corner position to obtain refined corner positions, said refined corner positions being used in said converting.

4. A method as recited in claim 1 further comprising:
    refining said corner descriptors using a neural network to produce refined corner descriptors;
    extracting said score matrix from said refined corner descriptors;
    refining said corner positions using said neural network to calculate an offset for said each corner position to obtain refined corner positions, said refined corner positions being used in said converting.

5. A method as recited in claim 1 wherein the machine-readable vector file uses the standard CMG, SVG, XMF, EPS, JSON, Geo-Json or Shapefiles.

6. A method as recited in claim 1 further comprising:
    extracting two score matrices from said corner descriptors that each indicates connections between said corner positions, a first of said two score matrices indicating connections in a clockwise direction and a second of said two score matrices indicating connections in a counter-clockwise direction; and
    converting said corner positions and said two score matrices into a machine-readable vector file that represents said N-dimensional image.

7. A method as recited in claim 1 wherein said machine-readable vector file is not pixel based.

8. A vectorization pipeline system, said system comprising:
    a descriptor extraction processing unit that receives a two-dimensional image and returns a descriptor for each pixel location in said image;
    a corner detection processing unit that processes said image and returns a plurality of corner positions of said image;
    a filter processing unit that filters said descriptors using said corner positions and returns corner descriptors for said corner positions;
    a score extraction processing unit that extracts a matrix of scores from said corner descriptors that indicates connections between said corner positions, each pair of corner positions being assigned a score and converts said matrix of scores into a permutation matrix; and
    a vector extraction unit that converts said corner positions and said permutation matrix into a machine-readable vector file.

9. A method of vectorization of an image, said method comprising:
    receiving a three-dimensional image;
    processing said image and returning a descriptor for each location in said image, each location being identified by three coordinates;
    processing said image and returning a plurality of corner positions of said image;
    filtering said descriptors using said corner positions and returning corner descriptors for said corner positions;
    extracting a score matrix from said corner descriptors that indicates connections between said corner positions, each pair of corner positions being assigned a score;
    converting said score matrix into a permutation matrix; and
    converting said corner positions and said permutation matrix into a machine-readable vector file that represents said three-dimensional image.

10. A method as recited in claim 9 further comprising:
    refining said corner descriptors using a neural network to produce refined corner descriptors; and
    extracting said score matrix from said refined corner descriptors.

11. A method as recited in claim 9 further comprising:
    refining said corner positions to calculate an offset for said each corner position to obtain refined corner positions, said refined corner positions being used in said converting.

12. A method as recited in claim 9 further comprising:
    refining said corner descriptors using a neural network to produce refined corner descriptors;
    extracting said score matrix from said refined corner descriptors;
    refining said corner positions using said neural network to calculate an offset for said each corner position to obtain refined corner positions, said refined corner positions being used in said converting.

13. A method as recited in claim 9 wherein the machine-readable vector file uses the standard CMG, SVG, XMF, EPS, JSON, Geo-Json or Shapefiles.

14. A method as recited in claim 9 further comprising:
    extracting two score matrices from said corner descriptors that each indicates connections between said corner positions, a first of said two score matrices indicating connections in a clockwise direction and a second of said two score matrices indicating connections in a counter-clockwise direction; and
    converting said corner positions and said two score matrices into a machine-readable vector file that represents said three-dimensional image.

15. A method of vectorization of an image, said method comprising:
   receiving an N-dimensional image, N being greater than three;
   processing said image and returning a descriptor for each location in said image, each location being identified by N coordinates;
   processing said image and returning a plurality of corner positions of said image;
   filtering said descriptors using said corner positions and returning corner descriptors for said corner positions;
   extracting a score matrix from said corner descriptors that indicates connections between said corner positions, each pair of corner positions being assigned a score;
   converting said score matrix into a permutation matrix; and
   converting said corner positions and said permutation matrix into a machine-readable vector file that represents said N-dimensional image.

16. A method as recited in claim 15 further comprising:
   refining said corner descriptors using a neural network to produce refined corner descriptors; and
   extracting said score matrix from said refined corner descriptors.

17. A method as recited in claim 15 further comprising:
   refining said corner positions to calculate an offset for said each corner position to obtain refined corner positions, said refined corner positions being used in said converting.

18. A method as recited in claim 15 further comprising:
   refining said corner descriptors using a neural network to produce refined corner descriptors;
   extracting said score matrix from said refined corner descriptors;
   refining said corner positions using said neural network to calculate an offset for said each corner position to obtain refined corner positions, said refined corner positions being used in said converting.

19. A method as recited in claim 15 wherein the machine-readable vector file uses the standard CMG, SVG, XMF, EPS, JSON, Geo-Json or Shapefiles.

20. A method as recited in claim 15 further comprising:
   extracting two score matrices from said corner descriptors that each indicates connections between said corner positions, a first of said two score matrices indicating connections in a clockwise direction and a second of said two score matrices indicating connections in a counter-clockwise direction; and
   converting said corner positions and said two score matrices into a machine-readable vector file that represents said N-dimensional image.

* * * * *